United States Patent
Drader et al.

(10) Patent No.: US 8,635,560 B2
(45) Date of Patent: Jan. 21, 2014

(54) SYSTEM AND METHOD FOR REDUCING POWER CONSUMPTION IN AN ELECTRONIC DEVICE HAVING A TOUCH-SENSITIVE DISPLAY

(75) Inventors: Marc Drader, Lans en Vercors (FR); Wolfgang Michael Theimer, Bochum (DE)

(73) Assignee: BlackBerry Limited, Waterloo (CA)

( * ) Notice: Subject to any disclaimer, the term of this patent is extended or adjusted under 35 U.S.C. 154(b) by 398 days.

(21) Appl. No.: 13/011,084

(22) Filed: Jan. 21, 2011

(65) Prior Publication Data

US 2012/0191993 A1    Jul. 26, 2012

(51) Int. Cl.
*G06F 3/033*     (2013.01)

(52) U.S. Cl.
USPC ............ 715/863; 713/320; 713/323; 345/173

(58) Field of Classification Search
USPC .................. 345/173–176; 713/320, 321, 323; 715/863
See application file for complete search history.

(56) References Cited

U.S. PATENT DOCUMENTS

| | | | |
|---|---|---|---|
| 5,553,296 A * | 9/1996 | Forrest et al. ................. | 713/323 |
| 5,605,406 A * | 2/1997 | Bowen .......................... | 400/472 |
| 6,429,857 B1 * | 8/2002 | Masters et al. ................. | 345/175 |
| 6,459,424 B1 * | 10/2002 | Resman ......................... | 345/173 |
| 7,593,000 B1 * | 9/2009 | Chin .............................. | 345/156 |
| 7,812,827 B2 * | 10/2010 | Hotelling et al. ............... | 345/173 |
| 8,094,128 B2 * | 1/2012 | Vu et al. ........................ | 345/173 |
| 8,230,246 B1 * | 7/2012 | Sharkey ......................... | 713/320 |
| 8,284,165 B2 * | 10/2012 | Koshiyama et al. ........... | 345/173 |
| 8,390,588 B2 * | 3/2013 | Vu et al. ......................... | 345/173 |
| 2003/0210286 A1 * | 11/2003 | Gerpheide et al. ............. | 345/863 |
| 2007/0130547 A1 * | 6/2007 | Boillot ............................ | 715/863 |
| 2008/0309631 A1 * | 12/2008 | Westerman et al. ........... | 345/173 |
| 2010/0149110 A1 * | 6/2010 | Gray .............................. | 345/173 |
| 2010/0155153 A1 * | 6/2010 | Zachut ........................... | 178/18.03 |
| 2010/0245286 A1 * | 9/2010 | Parker ............................ | 345/174 |
| 2010/0328265 A1 * | 12/2010 | Hotelling et al. .............. | 345/174 |

(Continued)

FOREIGN PATENT DOCUMENTS

WO    2008136551    11/2008

OTHER PUBLICATIONS

Wigdor et al. Rock & Rails: Extending Multi-touch Interactions with Shape Gestures to Enable Precise Spatial Manipulations. ACM. 2011.*

Lii et al. Gesture Coder: A Tool for Programming Multi-Touch Gestures by Demonstration. ACM. 2012.*

(Continued)

*Primary Examiner* — Matthew D Spittle
(74) *Attorney, Agent, or Firm* — Novak Druce Conolly Bove + Quigg LLP

(57) ABSTRACT

A system and method for reducing power consumption in an electronic device by controlling the transition of the electronic device from a sleep mode to a full power mode. The electronic device comprises a main processor a touch-sensitive overlay, and an overlay controller. A sequence of touch inputs on the touch-sensitive overlay are detected and captured using the overlay controller while the main processor is in the sleep mode. A subset of the sequence of touch inputs is processed using the overlay controller to determine that the sequence of touch inputs corresponds to a coarse model of a pre-determined wake-up gesture prior to transitioning the electronic device from the sleep mode to the full power mode.

20 Claims, 7 Drawing Sheets

(56) References Cited

U.S. PATENT DOCUMENTS

| | | | |
|---|---|---|---|
| 2011/0157068 A1* | 6/2011 | Parker et al. ................... | 345/174 |
| 2011/0302538 A1* | 12/2011 | Vennelakanti et al. ........ | 715/863 |
| 2012/0169660 A1* | 7/2012 | Seo ............................... | 345/174 |
| 2012/0306811 A1* | 12/2012 | Farmer et al. .................. | 345/174 |
| 2013/0162514 A1* | 6/2013 | Zawacki et al. ............... | 345/156 |

OTHER PUBLICATIONS

Park et al. E-Gesture: A Collaborative Architecture for Energy-efficient Gesture Recognition with Hand-worn Sensor and Mobile Devices. ACM. 2011.*

European Search Report dated Jun. 28, 2011. In corresponding application No. 11151755.3.

* cited by examiner

SYSTEM AND METHOD FOR REDUCING POWER CONSUMPTION IN AN ELECTRONIC DEVICE HAVING A TOUCH-SENSITIVE DISPLAY

TECHNICAL FIELD

The present disclosure relates to electronic devices having touch-sensitive displays and the control of such electronic devices.

BACKGROUND

Electronic devices, including portable electronic devices, have gained widespread use and may provide a variety of functions including, for example, telephonic, electronic messaging and other personal information manager PIM application functions. Portable electronic devices include, for example, several types of mobile stations such as simple cellular telephones, smart telephones, wireless personal digital assistants PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch screen or touchscreen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Portable electronic devices can typically individually control power supplied to different components of the device in order to save power and increase battery. For example, in a full power mode, the main components of the portable electronic device are supplied with power and are in an active state. In a sleep mode, one or more components of the portable electronic device are not supplied with power, or are supplied with reduced power, and are in an inactive state.

Portable electronic devices can be transitioned from full power mode to sleep mode, or from sleep mode to full power mode using a soft power control system. For example, when the portable electronic device is in full power mode, a signal from an input key or a system software time-out signal will transition the portable electronic device to sleep mode, or vice versa.

BRIEF DESCRIPTION OF THE DRAWINGS

Embodiments of the present disclosure will now be described, by way of example only, with reference to the attached figures, in which.

DETAILED DESCRIPTION

Figure 1:
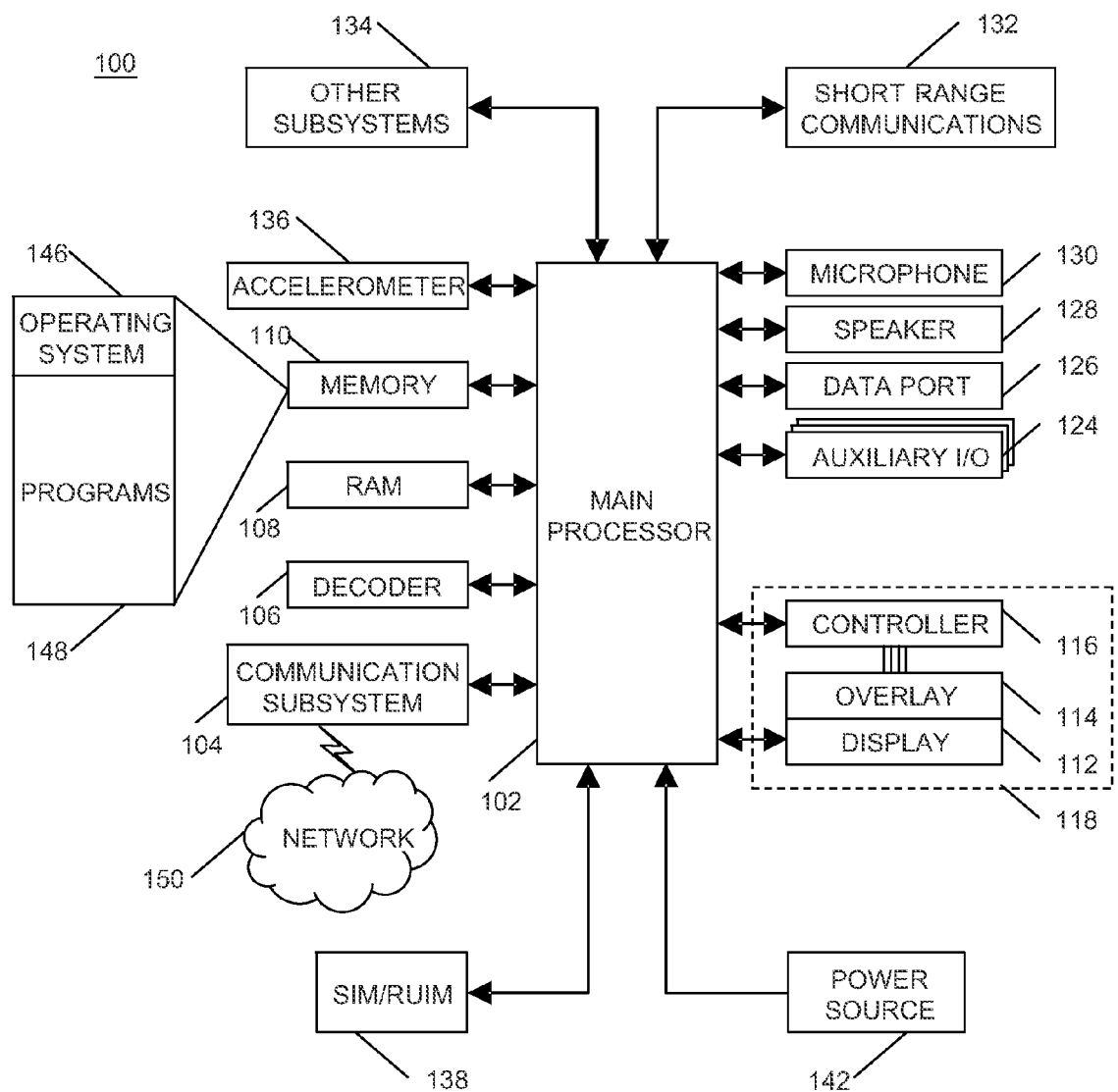
FIG. 1 is a simplified block diagram of one example of a portable electronic device in accordance with the present disclosure.

An electronic device having a touch screen requires power in order to wait for, record and then process every touch input to determine if the recorded touch input matches an input intended to wake-up the device from an idle or sleep mode to a full-power mode. The power required for the waiting and monitoring for a wake-up input or gesture can be a drain on the battery of the device. Improvements in electronic devices with touch-sensitive displays are desirable. An improvement involves providing a method, and related system, that reduces power consumption during sleep mode while at the same time determining whether contact with the touch-sensitive display was intended to transition the electronic device to the full power mode.

The following disclosure describes a method and system for reducing power consumption in an electronic device by controlling the transition of the electronic device from a sleep mode to full power mode. The method and system determines whether a sequence of touch inputs on the touch-sensitive overlay is intended to transition the electronic device to a full power mode from sleep mode.

Other aspects and features of the present disclosure will become apparent to those ordinarily skilled in the art upon review of the following description of example embodiments in conjunction with the accompanying figures.

For simplicity and clarity of illustration, reference numerals may be repeated among the figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein.

The disclosure generally relates to an electronic device, which is a portable electronic device in the example embodiments described herein. Examples of portable electronic devices include mobile, or handheld, wireless communication devices such as pagers, cellular phones, cellular smartphones, wireless organizers, PDAs, wirelessly enabled notebook computers, netbooks, and so forth. The portable electronic device may also include devices, such as a handheld electronic game device, digital photograph album, digital camera, or other device.

A block diagram of an example of a portable electronic device 100 is shown in FIG. 1. The portable electronic device 100 includes multiple components, such as a main processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from, and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The main processor 102 interacts with other components, such as Random Access Memory RAM 108, memory 110, a display 112 with a touch-sensitive overlay 114 operably connected to an overlay controller 116 that together comprise a touch-sensitive display 118, an auxiliary input/output I/O subsystem 124, a data port 126, a speaker 128, a microphone 130, short-range communications 132, and other device subsystems 134. Interaction with a graphical user interface is performed through the touch-sensitive overlay 114. The main processor 102 interacts with the touch-sensitive overlay 114 via the overlay controller 116. Information, such as text, characters, symbols, images, icons, and other items that may be displayed or rendered on a portable electronic device, is displayed on the touch-sensitive display 118 via the main processor 102. The main processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module SIM/RUIM card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The main processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave SAW touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts, touch inputs or touch events, may be detected by the touch-sensitive display 118. The main processor 102 and/or overlay controller 116 may determine and record attributes of the touch, including a location of a touch, a time stamp associated with the touch, and a pressure associated with the touch etc. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the overlay controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 that begins at an origin point and continues to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

In sleep mode, one or more of the components of the portable electronic device 100 is not drawing power, or is drawing reduced power, from the battery. The transition from sleep mode to full power mode may be made in a single step, or may be made over multiple steps. A wake-up gesture can be utilized to transition the portable electronic device 100 from sleep mode to full power mode. A wake-up gesture allows the user of the portable electronic device 100 to draw a gesture on the touch-sensitive display 118 to wake up or unlock the portable electronic device 100 from sleep mode. As described above, the wake-up gesture may be a sequence of touch inputs within a predetermined duration of time. The wake-up gesture may include a sequence of substantially continuous touch events or a sequence of individual touch events within the predetermined duration of time. The wake-up gesture may be any arbitrarily shaped gesture and may be set by the portable electronic device 100 during initial set up or by the user. For example, the wake-up gesture may be selected from a plurality of pre-recorded wake-up gestures stored in a wake-up gesture library in the portable electronic device 100. Alternatively, the user can record a customized wake-up gesture that can be added to the wake-up gesture library. The user-generated wake-up gesture or one of the pre-recoded wake-up gesture can then be selected as the pre-determined wake-up gesture to transition the device from the sleep mode to the full-power mode.

A wake-up gesture can also be associated with a user profile such that the portable electronic device 100 presents a unique set of applications customized according to the chosen user profile upon transitioning from a sleep mode to a full power mode. For example, for an individual user, one wake-up gesture may be associated with a work profile and another wake-up gesture may be associated with a personal profile. Each profile may have a different home screen with a different set of applications presented therein.

In addition, the portable electronic device may be used by multiple users, each having an associated wake-up gesture and a corresponding customized user profile.

Typically, processing every touch input to ascertain whether a touch input is a part of a wake-up gesture is power intensive. In addition, the main processor must be operating in full power mode to process each touch input, even when the touch input may be unintentional, for example, when the device is placed in a purse or a pocket. Routinely, the number of unintentional touch events exceeds the actual number of wake-up or unlock gestures. Thus, a method and system for reducing power consumption in an electronic device by controlling the transition of the electronic device from a sleep mode to a full power mode using a wake-up gesture is desirable.

According to one aspect of the present disclosure, the waiting for, recording and processing of a gesture to determine if the gesture corresponds to a pre-determined wake-up gesture is accomplished by distributing the processing of the touch inputs between the overlay controller 116 and the main processor 102. The overlay controller 116 and the main processor 102 have different power consumption and processing capabilities.

The overlay controller 116, also referred to as the touch panel controller, may have resource-constraints, limited memory and a slow interface compared to the host processor 102. Using the overlay controller 116 for preliminary gesture recognition, instead of the main processor 102, results in lower power usage. As the overlay controller 116 has limited processing capabilities, this advantageously results in further reduction of power usage.

Figure 2:
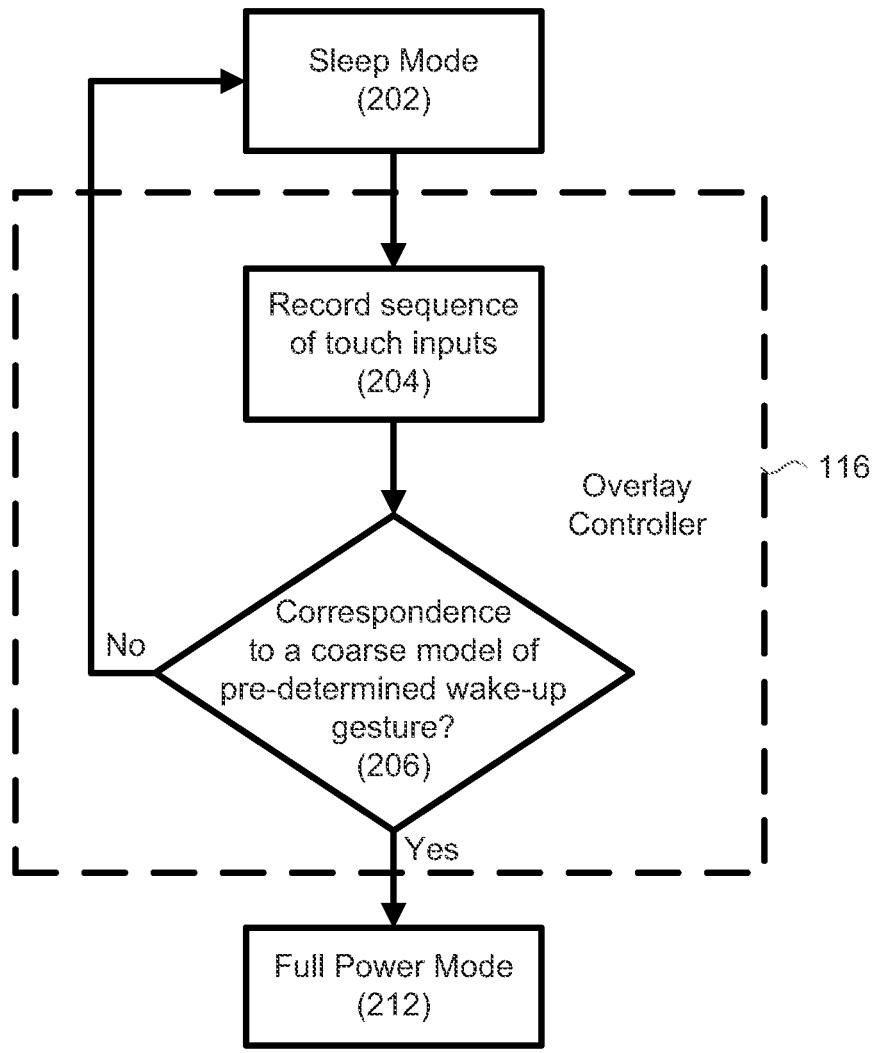
FIG. 2 is a flow chart illustrating an example embodiment of a method for transitioning from sleep mode to full power mode based on a sequence of touch inputs.

In an aspect, the method of reducing power consumption in the electronic device 100 is accomplished by controlling the transition of the electronic device from a sleep mode to a full power mode as shown in FIG. 2. While the electronic device, including the main processor 102, is in the sleep mode (202), the touch-sensitive overlay 114 and the overlay controller 116 can be maintained in full-power mode to detect and capture a sequence of touch inputs (or input gesture) on the touch-sensitive overlay (204). The overlay controller 116 can process a subset of the sequence of touch inputs to determine whether the sequence of touch inputs corresponds to a coarse model of a pre-determined wake-up gesture (206). Upon determining that the subset of the sequence of touch inputs matches a coarse model of the pre-determined wake-up gesture, the electronic device 100 can be transitioned from the sleep mode to the full power mode (212).

As described above, the overlay processor 116 has lower power requirements in comparison to the main processor 102. In order to advantageously utilize the lower power requirements of the overlay processor, the present method uses the overlay controller or processor 116 to monitor and capture touch inputs, including a sequence of touch inputs or gestures. Further, having regard to the limited processing capabilities of the overlay processor, only a subset of the sequence of touch inputs are used to compare to a coarse model of the pre-determined wake-up gesture. For example, 50% of the touch inputs of the sequence of touch inputs may be processed for determining whether the sequence of touch inputs corresponds to a coarse model of a pre-determined wake-up gesture.

Figure 3:
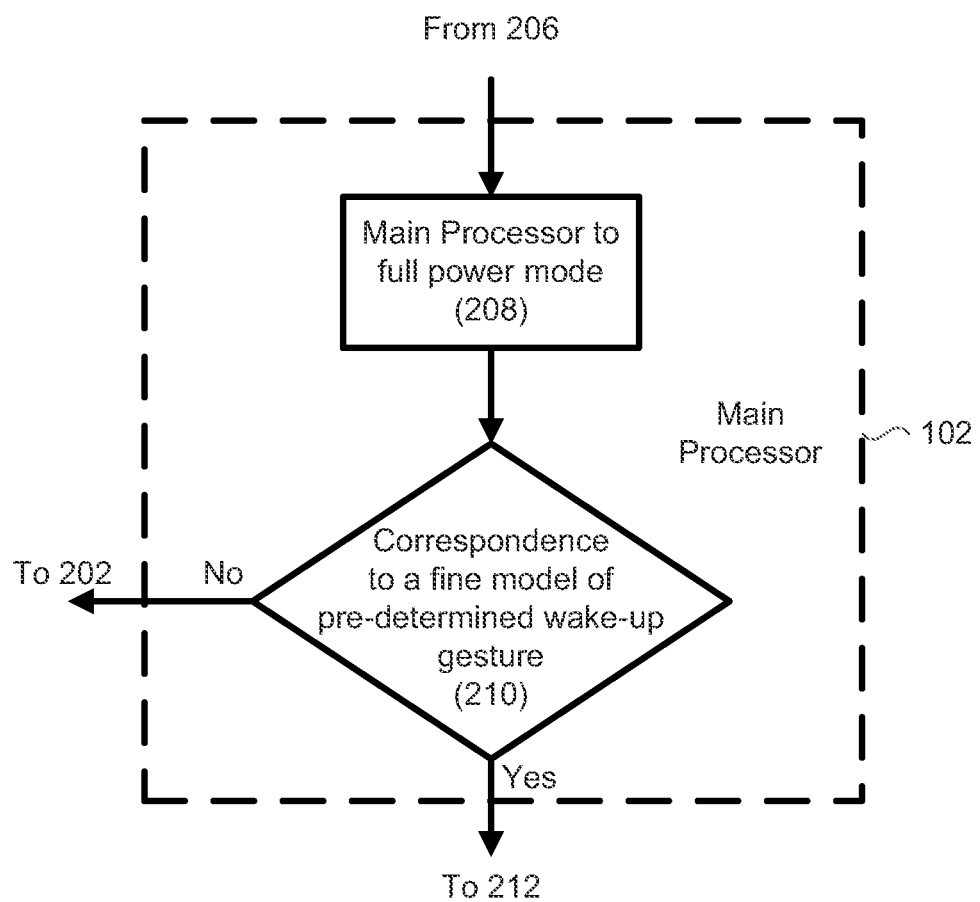
FIG. 3 is a flow chart illustrating additional processes for the method shown in FIG. 2 according to an example embodiment of the present disclosure.

However, in some instances where a higher threshold of correspondence between the sequence of touch inputs and the pre-determined wake-up gesture is required, additional processing is desirable. For example, the wake-up gesture may also be used as a passcode for locking or unlocking the electronic device. In such instances, upon successfully matching the input gesture with the pre-determined wake-up gesture using coarse models of the pre-determined wake-up gesture, the overlay processor may transition the main processor 102 to full power mode from the sleep mode (208), as shown in FIG. 3. The main processor 102 may then process the entire sequence of touch inputs, or a substantial part thereof, to determine further correspondence with the pre-determined wake-up gesture. This may be accomplished by comparing the entire sequence of the touch inputs to a fine model of the pre-determined wake-up gesture. Upon successful determination of a match between the input gesture and the fine model of the pre-determined wake-up gesture (210), the electronic device can be transitioned from the sleep mode to the full power mode.

It is noted that the terms "coarse model" and "fine model" are used herein to refer to the computational intensities required for feature extraction and classification. Typically, a coarse model check would be more tolerant for determining feature correspondence than a fine model. That is, the coarse model check may act as a first-level check to determine if a valid wake-up gesture is entered. On occasion, the coarse model check may result in a false-positive (resulting in a negative determination at the fine model check) or a false-negative (resulting in the electronic device remaining in the locked-up state or sleep mode), but the coarse model check avoids initiating the more intensive processing of a fine model check too frequently and the associated battery power consumption resulting in power savings.

Figure 4:
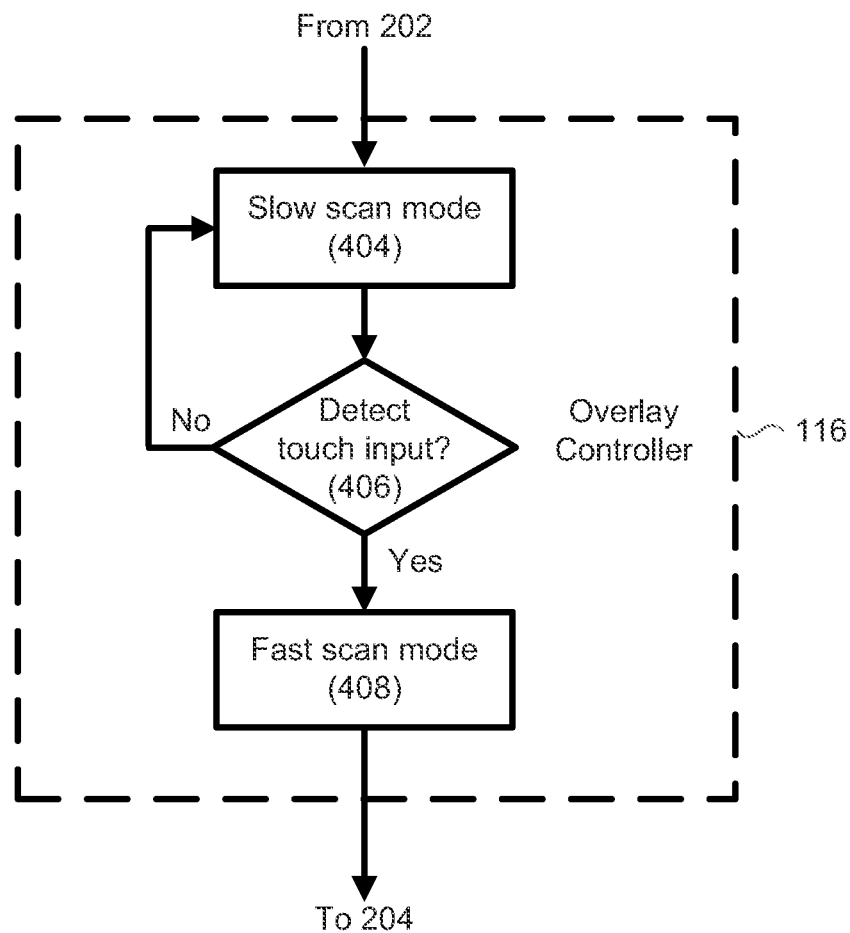
FIG. 4 is a flow chart illustrating additional processes for the method shown in FIG. 2 according to another example embodiment of the present disclosure.

It is recognized that running the touch-sensitive overlay 114 and the overlay controller in the full power mode as described above in anticipation of touch inputs can be a drain on the battery power. In order to further reduce the power requirements associated with waiting for, recording and processing the input gesture, during the sleep mode, the touch-sensitive overlay 114, the overlay controller 116, or both the touch-sensitive overlay 114 and the overlay controller 116 can be maintained in a slow scan mode (404), as shown in FIG. 4. The slow scan mode comprises duty cycling the touch-sensitive overlay 114 and/or the overlay controller 116 between the full power mode for a first (or active) period of time and the sleep mode for a second (or inactive) period of time. For reducing power consumption, the inactive period of time is substantially longer than the active period of time. Touch events are captured during the active period of time, when the touch-sensitive overlay 114 and the overlay controller 116 are in the full power mode.

Upon detecting a touch event (406), the touch-sensitive overlay 114 and overlay controller 116 are transitioned to a fast scan mode (408). The fast scan mode comprises duty cycling the touch-sensitive overlay 114 and the overlay controller 116 between the full power mode for an active period of time and the sleep mode for an inactive period of time, the inactive period of time in the fast scan mode being substantially shorter than the inactive period of time in the slow scan mode, to capture the sequence of touch inputs.

Figure 5A:
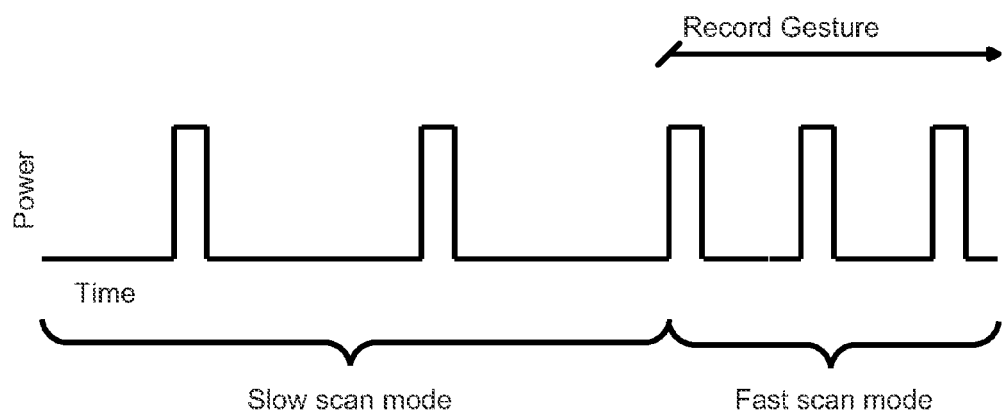
FIG. 5A is an illustration of a slow scan mode transitioning to a fast scan mode upon detection of a touch input.
Figure 5B:
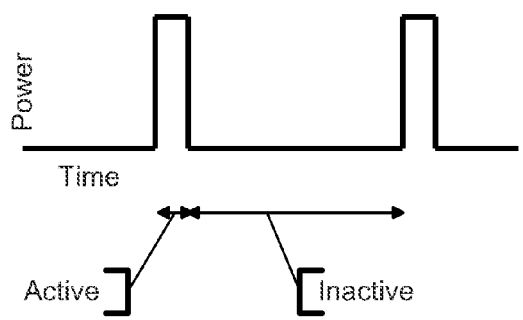
FIG. 5B is an illustration of a duty cycle in a slow scan mode.
Figure 5C:
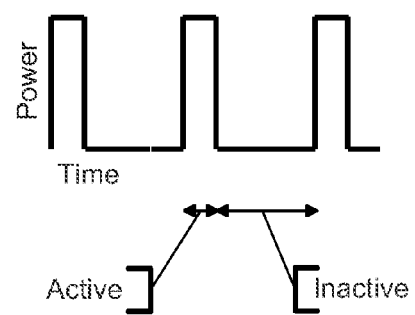
FIG. 5C is an illustration of a duty cycle in a fast scan mode.

Examples of duty cycling are illustrated in FIG. 5A through FIG. 5C. During a single duty cycle, the touch-sensitive overlay 114 and/or the overlay controller 116 are powered at full power mode for an "active" period of time and then powered at the sleep mode or reduced power level for the remaining time i.e. an "inactive" period of time, as illustrated in FIG. 5A through FIG. 5C. In various example embodiments, the sleep mode power level may correspond to a power level below full power depending on the desired level of power savings, but sufficiently high to maintain memory in a retention mode, where memory content is preserved but cannot be read out. Sleep mode is also known as a deep sleep mode.

The slow scan mode is a duty cycle where the active and inactive periods are set to reduce power consumption, which may inherently reduce the accuracy of capturing a gesture. The fast scan mode is a duty cycle where the active and inactive periods have been set to increase accuracy of capturing a gesture, which may thereby increase power consumption. FIG. 5A illustrates an embodiment where a gesture is recorded in a fast scan mode.

The active and inactive periods of time while duty cycling can be set in view of the typical lengths of various wake-up gestures. Detection and/or capturing of short gestures can use a greater proportion of active periods vs. inactive periods, or can use shorter inactive periods or both. Detection and/or capturing of long gestures can use a lower proportion of active periods vs. inactive periods, or can use longer inactive periods, or both. The various time periods in the slow scan mode and the fast scan mode can be optimized based on the characteristics of the pre-determined wake up gesture, such as duration, complexity etc.

In various aspects of the present disclosure, once the overlay controller 116 detects a touch input, the touch-sensitive overlay 114 and the overlay controller 116 are transitioned from a slow scan mode to a fast scan mode in order to capture the input gesture, as illustrated in FIG. 5A. In other aspects, when the overlay controller 116 detects a touch input, the touch-sensitive overlay 114 and overlay controller 116 maintain their duty cycle and capture the gesture, for instance, when the touch-sensitive overlay 114 and the overlay controller 116 are already in the fast scan mode, as shown in FIG. 5C.

Examples of slow and fast scan duty cycles are illustrated in FIG. 5B and FIG. 5C, respectively. FIG. 5B illustrates a slow scan duty cycle with an inactive period that is substantially longer than the active period. FIG. 5C illustrates a fast scan duty cycle with an inactive period that is substantially shorter than the inactive period of the slow scan duty cycle illustrated in FIG. 5B. That is, in the fast scan duty cycle, the touch-sensitive overlay and the overlay controller are active (at full power) more frequently.

In initial trials, the typical duration of gestures varied between 800 ms to 2000 ms. During a slow scan mode, which is set to reduce power consumption, the initial part of the input gesture may be undetected. For instance, the input gesture of the first touch event of the sequence of touch events may commence just as the touch-sensitive overlay 114 and the overlay controller 116 transition from the full power mode to the sleep mode. The touch input will then be detected only during the active period of the next duty cycle. Thus, the initial part of the input gesture up to the time interval of inactive part of the duty cycle will not be detected. However, the input gesture matching algorithms can be designed to tolerate such instances. For example, gesture matching processes can tolerate up to 10-15% of missing or undetected inputs, i.e., the initial 80-120 ms of a short wake-up gesture of 800 ms duration may go undetected and yet the input gestures can be successfully matched. Current limitations in electronics dictate that an active period of 5 ms is needed for detecting a touch input. Thus, for a gesture of 800 ms in duration, the slow scan duty cycle has to be 85-125 ms (approximately 6% to 4% of active period per duty cycle). For longer gestures, a slow scan mode with 2% active period per duty cycle may suffice. Thus, the duration of a slow scan mode can be set based on the characteristics of the pre-determined wake-up gesture, such as its duration or complexity.

It is observed that a typical touch event can be captured approximately every 20 ms. Thus, a typical fast scan mode may have a 5 ms active period and 15 ms inactive period (25% active period per duty cycle). The duration of the active period is typically maintained at 5 ms, while the duration of the inactive period can be optimized based on the duration of the pre-determined wake-up gesture.

Figure 6:
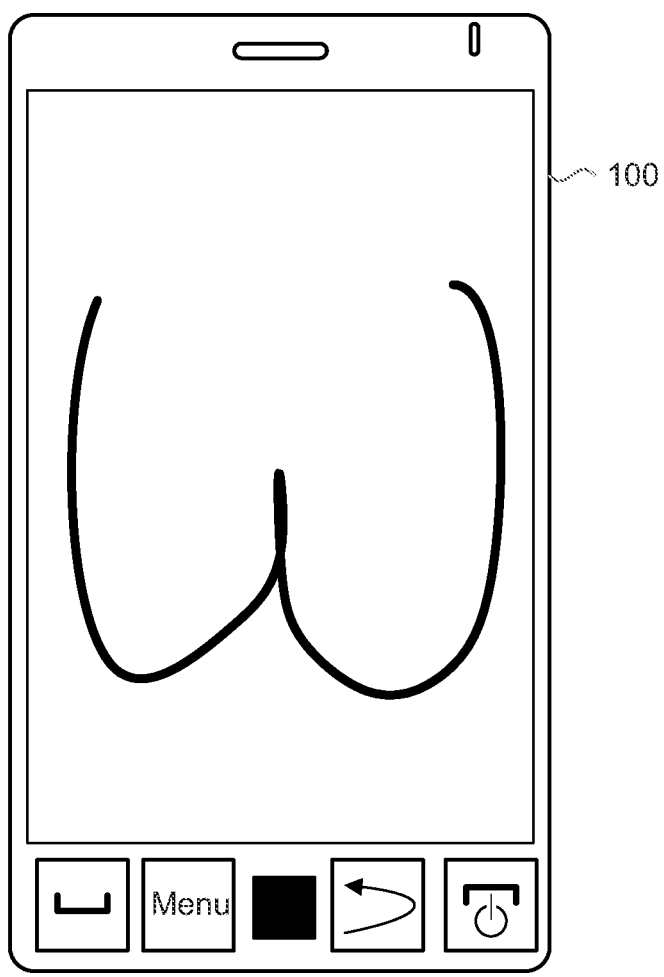
FIG. 6 is an illustration of a wake-up gesture.
Figure 7:
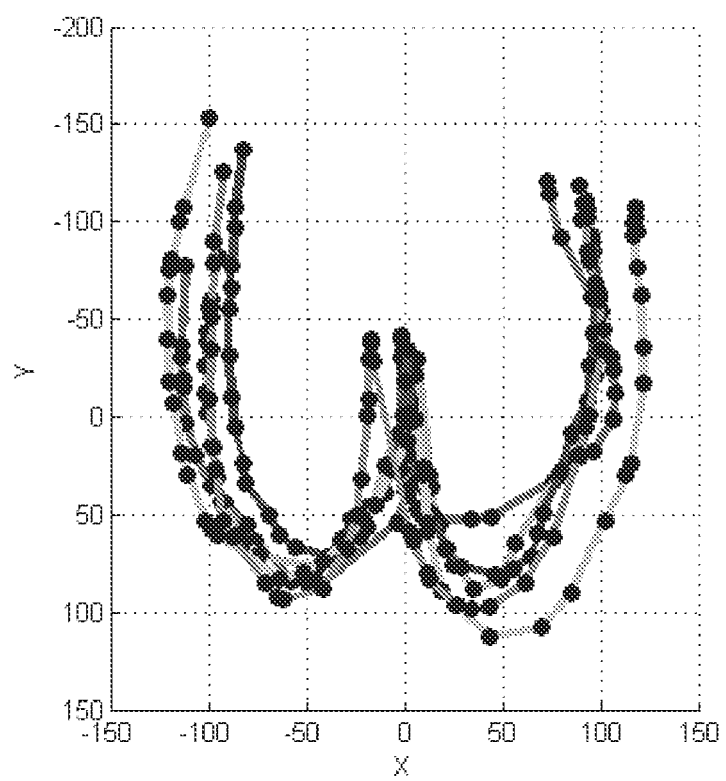
FIG. 7 is an graphical representation of multiple repetitions of the wake-up gesture in FIG. 6.

The overlay controller 116 can be used to capture the sequence of touch inputs or the input gesture as shown in FIG. 6. FIG. 7 shows multiple repetitions of the input gesture illustrated in FIG. 6, which may be used, for example, to generate characteristics of a pre-determined wake up gesture or for training purposes. The overlay controller 116 can store the coordinates of points along the path of the input gesture, and the related time stamps, in the overlay controller memory (not shown). When the overlay controller 116 is recording and/or initially determining whether or not the recorded input gesture corresponds to the pre-determined wake-up gesture, only the touch-sensitive overlay 114 and the overlay controller 116 draw power, while the remaining components of the portable electronic device 100 are in sleep mode. In FIG. 6, the black dots correspond to captured touch events (also referred to as touch inputs or data points). In a coarse model (or a first order model), the data points are connected by line segments and a match with the pre-determined wake-up gesture may be determined based on an accumulation of the length of the line segments. Whereas, in a fine model, the curvatures of the input gesture and the pre-determined wake-up gesture may be computed and more complex distance metrics may be used for the determination of a match.

As described earlier, the overlay controller 116 determines whether or not the input gesture and the pre-determined wake-up gesture correspond, using a subset of the touch inputs, i.e., fewer data points than used by the main processor 102. The main processor 102 can model the actual path of the input gesture by interpolating the sequence of touch inputs with a fixed number of data points for a fine match.

Each touch input captured by the overlay controller 116 is associated with a measured parameter. The measured parameter may be a location of the touch input, a time stamp of the touch input or a pressure of the touch input. The measured parameters of each of the touch inputs of the sequence of touch inputs forming the input gesture can be used for determining whether or not the input gesture corresponds to the pre-determined wake-up gesture. For coarse matching by the overlay controller 116, only a subset of the sequence of touch inputs is used, while the entire sequence of touch inputs, or a substantial part thereof, is used for fine matching by the main processor 102. The measured parameters of the touch inputs can be used to determine the total length, the total time duration, the sum of coordinate differences between adjacent points in an x- and y-direction etc. of the input gesture. In addition, velocity changes along the path, the standard deviation in the x- or y-direction, or a combination of any of these variables, and comparing the determined variable(s) or parameter(s) with the corresponding variable(s) for the pre-determined wake-up gesture.

For example, in a coarse match determination by the overlay controller 116, the total time duration of the input gesture can be matched with the total duration of the pre-determined wake-up gesture by using only the starting and ending touch inputs of the input gesture.

The input gesture can be said to correspond to the pre-determined wake-up gesture when the difference between one or more measured variable(s) of the input gesture and the corresponding variable(s) of the pre-determined wake-up gesture is within a threshold difference level(s). For example, the input gesture can be determined to correspond to the pre-determined wake-up gesture when the difference between the lengths of the input gesture and the pre-recoded wake-up gesture is less than 5% of the length of the pre-determined wake-up gesture. In another example, the input gesture can be determined to correspond to the pre-determined wake-up gesture when the difference between the total time durations of the input gesture and the pre-determined wake-up gesture is less than 10% of the total time duration of the pre-determined wake-up gesture. The threshold difference level of a measured variable can be, independently from any other threshold error level, 5%, 10%, 15% or 20% of the value of the corresponding variable of the pre-determined wake-up gesture.

If, after detecting a touch input, the overlay controller 116 does not detect any further touch inputs on the touch-sensitive overlay within a predetermined period of time, the touch-sensitive overlay 114 and the overlay controller 116 may be maintained in the slow scan mode for a predetermined lock-out period of time. This is advantageous when there is a spurious or inadvertent touch input that does not correspond to wake-up gesture. By maintaining the touch-sensitive overlay 114 and the overlay controller 116 in the slow scan mode for a predetermined lock-out period of time, unnecessary transitioning to the fast scan mode is prevented, thereby resulting in power savings.

Similarly, upon determining that the sequence of touch inputs does not correspond to the coarse model of the pre-determined wake-up gesture, the touch-sensitive overlay 114 and the overlay controller 116 may be maintained in the slow scan mode for a predetermined lock-out period of time. For example, touch inputs which do not correspond to the pre-determined wake-up gesture, can lead to undesirable power consumption. An unintended but continuous touch input could be considered an input gesture. In such a situation, the personal electronic device 100 would transition to a fast scan mode and record the input gesture. Processing the unintended input gesture and determining that the unintended input gesture does not correspond to the pre-determined wake-up gesture would transition the personal electronic device back into the slow scan mode. However, since the touch input is unintended and continuous, the personal electronic device 100 would again transition to the fast scan mode, undesirably consuming power. In order to avoid such repeated transition to fast scan mode, a time-out or lock-out period of time may be used. After the overlay controller 116 determines that the input gesture does not correspond to the pre-determined wake-up gesture, the touch-sensitive overlay and the overlay controller may be maintained in the slow scan mode for the duration of the lock-out period.

Any or all of (1) slow and fast scan modes having varying duty cycles, (2) rejection of non-gestures, (3) coarse match determination by the overlay controller that the input gesture and the pre-determined wake-up gesture correspond, or (4) further processing by the main processor once the input gesture and the pre-determined wake-up gesture are coarse matched, can be used to reduce the power consumption of the portable electronic device during a sleep mode while still determining whether contact with the touch-sensitive display was intended to transition the portable electronic device to full power mode.

In the foregoing description, for purposes of explanation, numerous details are set forth in order to provide a thorough understanding of the present disclosure. However, it will be apparent to one skilled in the art that these specific details are not required. In other instances, well-known electrical structures and circuits are shown in block diagram form in order not to obscure the present disclosure. For example, specific details are not provided as to whether the embodiments described herein are implemented as a software routine, hardware circuit, firmware, or a combination thereof.

Example embodiments described herein may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine readable medium may interface with circuitry to perform the described tasks.

While the example embodiments described herein are directed to particular implementations of the portable electronic device and method of controlling the portable electronic device, the above-described embodiments are intended to be examples. Alterations, modifications and variations may be effected to the particular embodiments by those of skill in the art without departing from the scope of the present disclosure.

What is claimed is:

1. A method for reducing power consumption in an electronic device by controlling the transition of the electronic device from a sleep mode to a full power mode, the electronic device comprising a main processor, a touch-sensitive overlay, and an overlay controller, the method comprising:
    detecting and capturing a sequence of touch inputs on the touch-sensitive overlay using the overlay controller while the main processor is in the sleep mode;
    processing a subset of the sequence of touch inputs using the overlay controller to determine that the sequence of touch inputs corresponds to a coarse model of a pre-determined wake-up gesture, the pre-determined wake-up gesture being adapted to transition the electronic device from the sleep mode to the full-power mode;
    transitioning the main processor from the sleep mode to the full power mode;
    processing the entire sequence of touch inputs using the main processor to determine that the sequence of touch inputs corresponds to a fine model of the pre-determined wake-up gesture to transition the electronic device from the sleep mode to the full power mode; and,
    transitioning the electronic device from the sleep mode to the full power mode.

2. The method of claim 1, wherein, prior to capturing the sequence of touch inputs, the method further comprises:
    maintaining the touch-sensitive overlay and the overlay controller in a slow scan mode, the slow scan mode comprising duty cycling the touch-sensitive overlay and the overlay controller between the full power mode for a first period of time and the sleep mode for a second period of time, the second period of time being substantially longer than the first period of time; and,
    upon detecting a touch input on the touch-sensitive overlay, transitioning the touch-sensitive overlay and the overlay controller to a fast scan mode, the fast scan mode comprising duty cycling the touch-sensitive overlay and the overlay controller between the full power mode for the first period of time and the sleep mode for a third period of time, the third period of time being substantially shorter than the second period of time, to capture the sequence of touch inputs.

3. The method of claim 2, wherein upon detecting no further touch input on the touch-sensitive overlay within a predetermined period of time, maintaining the touch-sensitive overlay and the overlay controller in the slow scan mode for a predetermined lock-out period of time.

4. The method of claim 2, wherein, upon determining that the sequence of touch inputs does not correspond to the coarse model of the pre-determined wake-up gesture, maintaining the touch-sensitive overlay and the overlay controller in the slow scan mode for a predetermined lock-out period of time.

5. The method of claim 1, wherein each touch input of the sequence of touch inputs is associated with a measured parameter.

6. The method of claim 5, wherein processing the subset of the sequence of touch inputs using the overlay controller comprises comparing the measured parameter of each touch input in the subset of the sequence of touch inputs to a corresponding parameter of the coarse model of the pre-determined wake-up gesture.

7. The method of claim 5, wherein processing the entire sequence of touch inputs using the main processor comprises comparing the measured parameter of each touch input in the entire sequence of touch inputs to a corresponding parameter of the fine model of the pre-determined wake-up gesture.

8. The method of claim 5, wherein the measured parameter is a location of the touch input, a time stamp of the touch input, or a pressure of the touch input.

9. The method of claim 1, wherein the pre-determined wake-up gesture is selected from a plurality of pre-recorded wake-up gestures stored in a wake-up gesture library of the electronic device.

10. The method of claim 1, wherein the pre-determined wake-up gesture is a user-generated wake-up gesture.

11. The method of claim 1, wherein the pre-determined wake-up gesture corresponds to a user profile.

12. An electronic device comprising:
a main processor;
a touch-sensitive overlay; and
an overlay controller, the overlay controller being configured to:
detect and capture a sequence of touch inputs on the touch-sensitive overlay while the main processor is in a sleep mode;
process a subset of the sequence of touch inputs to determine that the sequence of touch inputs corresponds to a coarse model of a pre-determined wake-up gesture, the pre-determined wake-up gesture being adapted to transition the electronic device from the sleep mode to a full-power mode;
transition the main processor from the sleep mode to the full power mode, the main processor being configured to:
process the entire sequence of touch inputs to determine that the wake-up gesture corresponds to a fine model of the pre-determined wake-up gesture to transition the electronic device from the sleep mode to the full power mode; and,
transition the electronic device from the sleep mode to the full power mode.

13. The electronic device of claim 12, wherein, prior to capturing the sequence of touch inputs, the touch-sensitive overlay and the overlay controller being configured to be maintained in a slow scan mode, the slow scan mode comprising duty cycling the touch-sensitive overlay and the overlay controller between the full power mode for a first period of time and the sleep mode for a second period of time, the second period of time being substantially longer than the first period of time; and,
upon detecting a touch input on the touch-sensitive overlay, the touch-sensitive overlay and the overlay controller being configured to transition to a fast scan mode, the fast scan mode comprising duty cycling the touch-sensitive overlay and the overlay controller between the full power mode for the first period of time and the sleep mode for a third period of time, the third period of time being substantially shorter than the second period of time, to record the sequence of touch inputs.

14. The electronic device of claim 13, wherein upon detecting no further touch input on the touch-sensitive overlay within a predetermined period of time, the touch-sensitive overlay and the overlay controller being configured to be maintained in the slow scan mode for a predetermined lock-out period of time; and
upon determining that the sequence of touch inputs does not correspond to the coarse model of the pre-determined wake-up gesture, the touch-sensitive overlay and the overlay controller being configured to be maintained in the slow scan mode for the predetermined lock-out period of time.

15. The electronic device of claim 12, wherein each touch input of the sequence of touch inputs is associated with a measured parameter.

16. The electronic device of claim 15, wherein processing the subset of the sequence of touch inputs comprises comparing the measured parameter of each touch input in the subset of the sequence of touch inputs to a corresponding parameter of the coarse model of the pre-determined wake-up gesture; and
processing the entire sequence of touch inputs comprises comparing the measured parameter of each touch input in the entire sequence of touch inputs to a corresponding parameter of the fine model of the pre-determined wake-up gesture.

17. The electronic device of claim 15, wherein the measured parameter is a location of the touch input, a time stamp of the touch input, or a pressure of the touch input.

18. A computer-readable medium having tangibly recorded thereon a set of non-transitory instructions for execution by an electronic device having a main processor, a touch-sensitive overlay, and an overlay controller, the non-transitory instructions for carrying out a method for reducing power consumption in the electronic device by controlling the transition of the electronic device from a sleep mode to a full power mode, the method comprising:
detecting and capturing a sequence of touch inputs on the touch-sensitive overlay using the overlay controller while the main processor is in the sleep mode;
processing a subset of the sequence of touch inputs using the overlay controller to determine that the sequence of touch inputs corresponds to a coarse model of a pre-determined wake-up gesture, the pre-determined wake-up gesture being adapted to transition the electronic device from the sleep mode to the full-power mode;
transitioning the main processor from the sleep mode to the full power mode;
processing the entire sequence of touch inputs using the main processor to determine that the sequence of touch inputs corresponds to a fine model of the pre-determined wake-up gesture to transition the electronic device from the sleep mode to the full power mode; and, transitioning the electronic device from the sleep mode to the full power mode.

19. The computer-readable medium of claim 18, wherein, prior to capturing the sequence of touch inputs, the method further comprises:

maintaining the touch-sensitive overlay and the overlay controller in a slow scan mode, the slow scan mode comprising duty cycling the touch-sensitive overlay and the overlay controller between the full power mode for a first period of time and the sleep mode for a second period of time, the second period of time being substantially longer than the first period of time; and, upon detecting a touch input on the touch-sensitive overlay, transitioning the touch-sensitive overlay and the overlay controller to a fast scan mode, the fast scan mode comprising duty cycling the touch-sensitive overlay and the overlay controller between the full power mode for the first period of time and the sleep mode for a third period of time, the third period of time being substantially shorter than the second period of time, to capture the sequence of touch inputs.

20. The computer-readable medium of claim 19, wherein upon detecting no further touch input on the touch-sensitive overlay within a predetermined period of time, maintaining the touch-sensitive overlay and the overlay controller in the slow scan mode for a predetermined lock-out period of time.

* * * * *